(12) United States Patent
Lee et al.

(10) Patent No.: US 11,797,125 B2
(45) Date of Patent: Oct. 24, 2023

(54) DRIVING APPARATUS FOR TOUCH DISPLAY DEVICE AND DRIVING METHOD FOR TOUCH DISPLAY DEVICE

(71) Applicant: LX SEMICON CO., LTD., Daejeon (KR)

(72) Inventors: Kwang Jun Lee, Daejeon (KR); Woong Jin Oh, Daejeon (KR); Yong Min Kim, Daejeon (KR); Jae Woo Jeon, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/747,085

(22) Filed: May 18, 2022

(65) Prior Publication Data
US 2023/0071380 A1    Mar. 9, 2023

(30) Foreign Application Priority Data
Sep. 6, 2021    (KR) .......................... 10-2021-0118556

(51) Int. Cl.
*G06F 3/041*    (2006.01)
*G06F 3/044*    (2006.01)

(52) U.S. Cl.
CPC .......... *G06F 3/04166* (2019.05); *G06F 3/044* (2013.01)

(58) Field of Classification Search
CPC .............................. G06F 3/04166; G06F 3/044
See application file for complete search history.

(56) References Cited

U.S. PATENT DOCUMENTS

| | | | |
|---|---|---|---|
| 2013/0342478 A1* | 12/2013 | Bae ........................ | G06F 3/0443 345/173 |
| 2016/0275897 A1 | 9/2016 | Lin et al. | |
| 2018/0024677 A1* | 1/2018 | Kim ....................... | G06F 3/0412 345/173 |
| 2018/0095573 A1* | 4/2018 | Kwon ................... | G06F 3/04184 |

FOREIGN PATENT DOCUMENTS

KR    10-2018-0079180 A    7/2018

* cited by examiner

*Primary Examiner* — Hong Zhou
(74) *Attorney, Agent, or Firm* — ROTHWELL, FIGG, ERNST & MANBECK, P.C.

(57) ABSTRACT

Provided is a driving apparatus for the touch display device including: a signal generation circuit that generates a second image signal using an input first image signal and outputs the second image signal in a display period, and generates a common voltage signal and outputs the common voltage signal in a touch sensing period; and a dummy signal output determination circuit that determines whether to output a dummy signal using the second image signal, wherein when it is determined to output the dummy signal by the dummy signal output determination circuit, the signal generation circuit generates at least one dummy signal using the second image signal and the common voltage signal and outputs the at least one dummy signal in the display period.

18 Claims, 11 Drawing Sheets

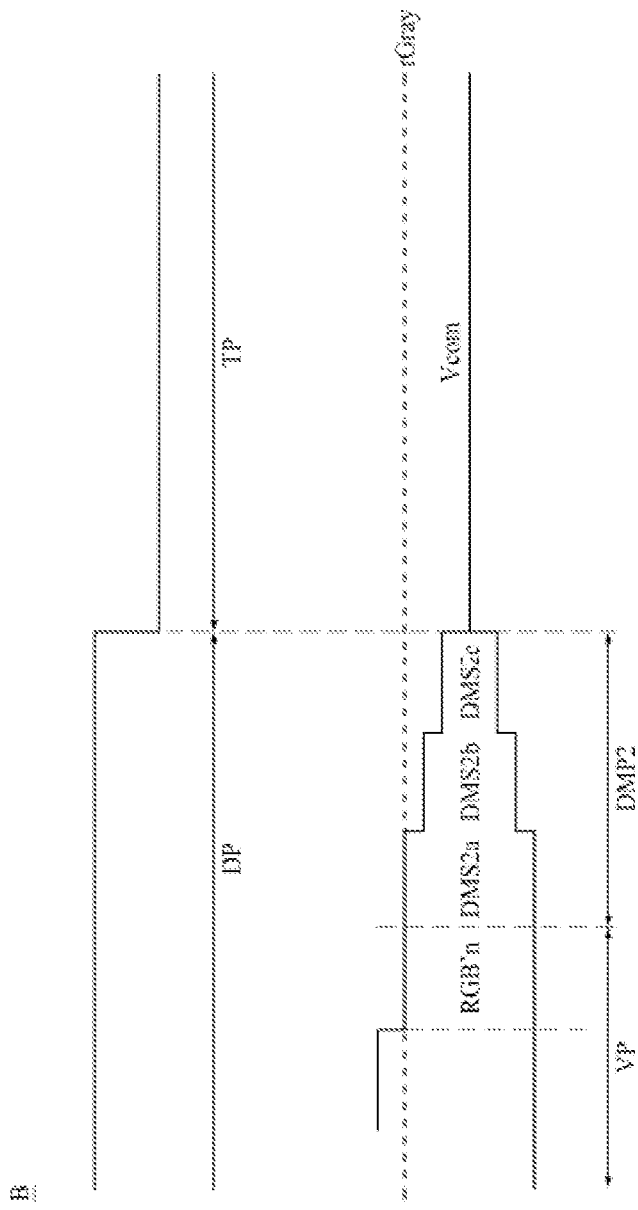

DRIVING APPARATUS FOR TOUCH DISPLAY DEVICE AND DRIVING METHOD FOR TOUCH DISPLAY DEVICE

CROSS-REFERENCE TO RELATED APPLICATIONS

This application claims the benefit of the Korean Patent Applications No. 10-2021-0118556 filed on Sep. 6, 2021 which is hereby incorporated by reference as if fully set forth herein.

FIELD OF THE INVENTION

The present disclosure relates to a driving apparatus for a touch display device and a driving method for a touch display device.

BACKGROUND

As a display device that displays an image, a liquid crystal display (LCD) using liquid crystal and an organic light emitting diode (OLED) display using an organic light emitting diode are representative.

Recently, a display device (hereinafter referred to as "touch display device") having a touch screen panel capable of sensing a touch input by a user's finger or a stylus pen is widely used by breaking away from usual input methods such as a button, a keyboard, and a mouse. The above-described touch display device includes a touch sensing device.

A driving apparatus for the touch display device includes a display driving apparatus that drives the display device and a touch sensing device that detects the presence of a touch and touch coordinates (or a touch position). In detail, the touch sensing device detects touch sensing data by driving touch sensors (or touch electrodes) and detects touch information including the presence of the touch or the touch coordinates using the detected touch sensing data.

In this case, a display defect may occur due to a voltage difference between signals input to the touch display panel by the driving apparatus for the touch display device.

SUMMARY

The present disclosure is designed to solve the problems described above and is directed to providing a driving apparatus for the touch display device and a driving method for the touch display device.

A driving apparatus for the touch display device according to one embodiment of the present disclosure includes: a signal generation circuit that generates a second image signal using an input first image signal and outputs the second image signal in a display period, and generates a common voltage signal and outputs the common voltage signal in a touch sensing period; and a dummy signal output determination circuit that determines whether to output a dummy signal using the second image signal, wherein when it is determined to output the dummy signal by the dummy signal output determination circuit, the signal generation circuit generates at least one dummy signal using the second image signal and the common voltage signal and outputs the at least one dummy signal in the display period.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 12 is a detailed timing diagram of a signal output in period B from the timing controller according to another embodiment of the present disclosure.

DETAILED DESCRIPTION

Figure 1:
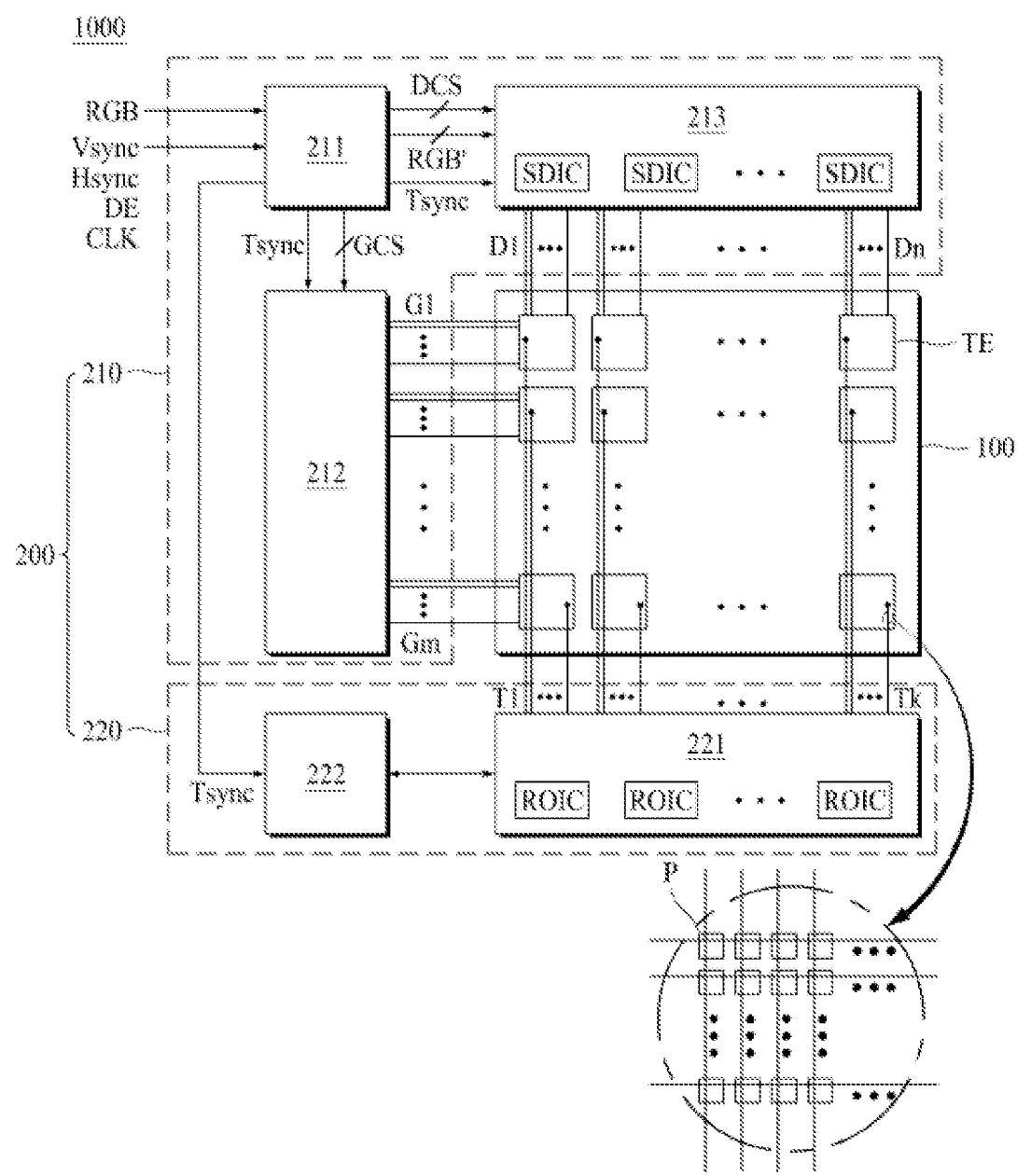
FIG. 1 is a configuration diagram of a touch display device including a driving apparatus for the touch display device according to one embodiment of the present disclosure.

In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, a touch display device and a driving apparatus for the touch display device according to the present disclosure will be described in detail with reference to FIGS. 1 to 3.

Figure 2:
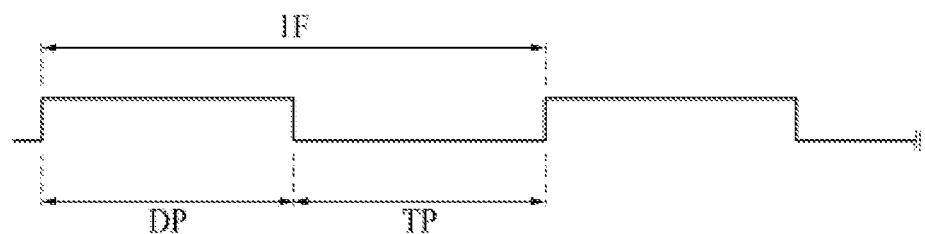
FIG. 2 is a timing diagram of a display period and a touch sensing period in one frame of the driving apparatus for the touch display device according to one embodiment of the present disclosure.
Figure 3:
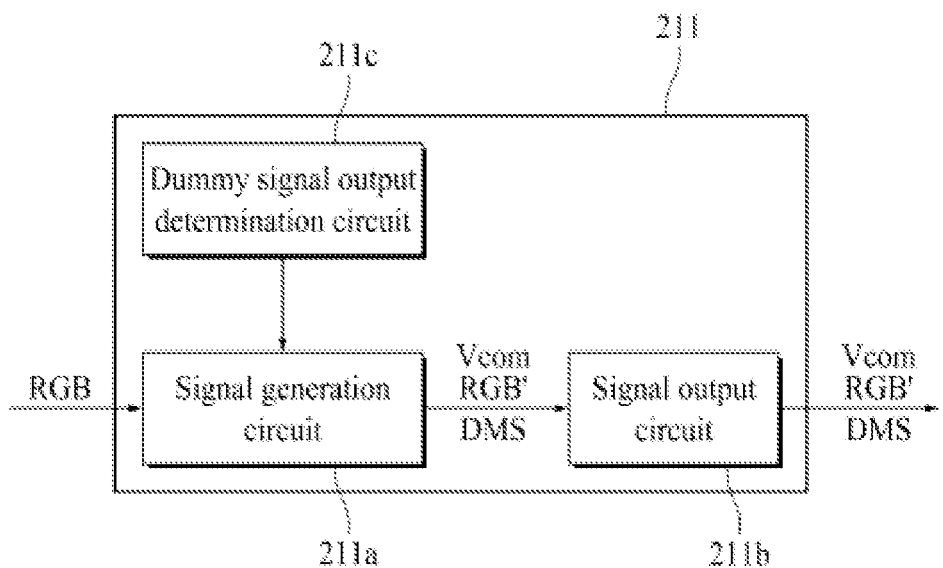
FIG. 3 is a configuration diagram of a timing controller according to one embodiment of the present disclosure.

FIG. 1 is a configuration diagram of a touch display device including a driving apparatus for the touch display device according to one embodiment of the present disclosure, and FIG. 2 is a timing diagram of a display period and a touch sensing period in one frame of the driving apparatus for the touch display device according to one embodiment of the present disclosure. FIG. 3 is a configuration diagram of a timing controller according to one embodiment of the present disclosure.

Referring to FIG. 1, a display device 1000 according to one embodiment of the present disclosure includes a touch display panel 100 and a driving apparatus 200.

The display device 1000 may perform a display function and a touch sensing function and may be implemented as a flat panel display such as a liquid crystal display (LCD) or an organic light emitting diode (OLED) display.

As shown in FIG. 2, the touch display panel 100 may be driven in a display period DP and a touch sensing period TP. The touch display panel 100 displays an image during the display period DP and serves as a touch panel for touch sensing during the touch sensing period TP.

The touch display panel 100 displays an image of a predetermined grayscale or receives a touch input. The touch display panel 100 may be an in-cell touch type display panel using a capacitance scheme. Alternatively, the touch display panel 100 may be an in-cell touch-type display panel using a self-capacitance scheme or an in-cell touch-type display panel using a mutual capacitance scheme.

The touch display panel 100 includes a plurality of gate lines G1 to Gm, a plurality of data lines D1 to Dn, a plurality of pixels P, a plurality of touch sensors TE, and a plurality of touch lines T1 to Tk.

Each of the plurality of gate lines G1 to Gm receives a scan pulse during the display period DP. Each of the plurality of data lines D1 to Dn receives a data signal during the display period DP. Each of the plurality of gate lines G1 to Gm and each of the plurality of data lines D1 to Dn are positioned to cross each other on a substrate to define a plurality of pixel regions. Each of the plurality of pixels P may include a thin film transistor (not shown) connected to adjacent gate and data lines, a pixel electrode (not shown) connected to the thin film transistor, and a storage capacitor (not shown) connected to the pixel electrode.

Each of the plurality of touch sensors TE may serve as a touch electrode sensing a touch or as a common electrode driving a liquid crystal by forming an electric field together with the pixel electrode. That is, each of the plurality of touch sensors TE may be used as the touch electrode during the touch sensing period TP and may be used as the common electrode during the display period DP. Accordingly, each of the plurality of touch sensors TE may include a transparent conductive material.

Since each of the plurality of touch sensors TE is used as a self-capacitance touch sensor during the touch sensing period TP, each of the plurality of touch sensors TE should have a size larger than a minimum contact size between a touch object and the touch display panel 100. Accordingly, each of the plurality of touch sensors TE may have a size corresponding to one or more pixels P. The plurality of touch sensors TE may be disposed at regular intervals along a plurality of horizontal lines and a plurality of vertical lines. The driving apparatus 200 supplies a common voltage to a touch sensor TE corresponding to each of the plurality of touch lines T1 to Tk during the display period DP. Each of the plurality of touch lines T1 to Tk is individually connected to each of the plurality of touch sensors TE.

The driving apparatus for the touch display device 200 supplies a data signal to the plurality of pixels P included in the touch display panel 100 during the display period DP so as to display an image through the touch display panel 100 and senses the touch through the touch sensors TE.

The driving apparatus 200 includes a display driving apparatus 210 and a touch sensing device 220.

The display driving apparatus 210 supplies the data signal to the plurality of pixels P included in the touch display panel 100 during the display period DP so as to display an image through the touch display panel 100.

The display driving apparatus 210 includes a timing controller 211, a gate driving apparatus 212, and a data driving apparatus 213.

The timing controller 211 receives various timing signals including a vertical synchronization signal Vsync, a horizontal synchronization signal Hsync, a data enable (DE) signal, and a clock signal CLK from an external system (not shown) to generate a gate control signal (GCS) for controlling the gate driving apparatus 212 and a data control signal (DCS) for controlling the data driving apparatus 213. Also, the timing controller 211 receives a first image signal RGB from the external system to convert the first image signal RGB into a second image signal RGB' having a form that may be processed in the data driving apparatus 213 and outputs the converted second image signal RGB'.

Meanwhile, the timing controller 211 may generate an internal data enable signal (iDE) by compressing an external data enable signal transmitted from a host system within a preset display period DP. As shown in FIG. 2, the timing controller 211 may generate a touch synchronization signal Tsync that time-divides one frame period 1F into the display period DP and the touch sensing period TP according to a timing of a vertical synchronization signal Vsync and the internal data enable signal. The timing controller 211 may transmit the touch synchronization signal Tsync to the gate driving apparatus 212, the data driving apparatus 213, a touch driving apparatus 221, and a touch controller 222.

The host system converts digital image data into a format suitable for display on the touch display panel 100. The host system transmits timing signals together with digital image data to the timing controller 211. The host system is implemented as any one of a television system, a set-top box, a navigation system, a DVD player, a Blue-ray player, a personal computer (PC), a home theater system, and a phone system to receive an input image.

Meanwhile, the host system may receive touch input coordinates from the touch controller 222 and execute an application program linked to the received touch input coordinates.

According to one embodiment of the present disclosure, the timing controller 211 may output a dummy signal DMS during a dummy period (DMP1 and DMP2 of FIG. 4) described later. In detail, as shown in FIG. 3, the timing controller 211 may include a signal generation circuit 211a, a signal output circuit 211b, and a dummy signal output determination circuit 211c.

The signal generation circuit 211a may generate a second image signal RGB', a common voltage signal Vcom, and a dummy signal DMS. In detail, the signal generation circuit 211a may receive the first image signal RGB from the external system during the display period DP to generate the second image signal RGB' in a form that may be processed by the data driving apparatus 213, and may generate at least one dummy signal DMS using the second image signal RGB' and the common voltage signal Vcom. In this case, the dummy signal DMS may have a value between the common voltage signal Vcom and a first second image signal or a last second image signal. Also, the signal generation circuit 211a may generate the common voltage signal Vcom during the touch sensing period TP. This will be described in detail later with reference to FIGS. 4 to 12.

The signal output circuit 211b outputs the signals generated by the signal generation circuit 211a to the gate driving apparatus 212, the data driving apparatus 213, and the touch sensing device 220. In detail, the signal output circuit 211b outputs at least one dummy signal DMS or the second image signal RGB' during the display period DP and outputs the common voltage signal Vcom during the touch sensing period TP.

The dummy signal output determination circuit 211c may determine whether to output the dummy signal DMS by using the second image signal RGB'. This will be described in detail later with reference to FIGS. 4 to 12.

Referring again to FIG. 1, the gate driving apparatus 212 receives the gate control signal GCS from the timing controller 211 during the display period DP. The gate control signal GCS may include a gate start pulse GSP, a gate shift clock GSC, and a gate output enable signal GOE. The gate driving apparatus 212 generates a gate pulse (or scan pulse) synchronized with the data signal through the received gate control signal GCS and shifts the generated gate pulse to sequentially apply the gate pulse to the gate lines G1 to Gm. To this end, the gate driving apparatus 212 may include a plurality of gate drive ICs (not shown). The gate drive ICs sequentially supply gate pulses synchronized with the data signal to the gate lines G1 to Gm according to the control of the timing controller 211 during the display period DP to select the data line on which the data signal is written. The gate pulse swings between a gate high voltage and a gate low voltage.

The gate driving apparatus 212 may supply a gate low voltage VGL to the gate lines G1 to Gm without generating the gate pulse during the touch sensing period TP. Accordingly, the gate lines G1 to Gm supply the gate pulse to the thin film transistor TFT of each pixel during the display period DP to sequentially select the data line on which the data signal is written in the touch display panel 100, and maintain the gate low voltage during the touch sensing period TP to prevent variations in the output of the touch sensors.

The data driving apparatus 213 receives the data control signal DCS, the second image signal RGB', and the dummy signal DMS from the timing controller 211 during the display period DP. The data control signal DCS may include a source start pulse (SSP), a source sampling clock (SSC), and a source output enable signal (SOE). The source start pulse controls a data sampling start timing of n source drive ICs (not shown) constituting the data driving apparatus 213. The source sampling clock is a clock signal that controls a sampling timing of data in each of the source drive ICs. The source output enable signal controls an output timing of each of the source drive ICs.

According to one embodiment of the present disclosure, the data driving apparatus 213 may receive at least one dummy signal that is gradually changed from the timing controller 211.

Also, the data driving apparatus 213 converts the received second image signal RGB' into an analog data signal and supplies the converted analog data signal to the pixels P through the plurality of data lines D1 to Dn.

The touch sensing device 220 senses a touch through the touch sensors TE during the touch sensing period TP. In detail, the touch sensing device 220 supplies touch driving signals to the touch sensors TE to drive the touch sensor TE and senses a change in capacitance generated when the touch sensor TE is touched.

When the touch display panel 100 is implemented in the mutual capacitance type, a read-out integrated circuit ROIC may include a driving circuit that generates the touch driving signal for driving the touch sensor TE to supply the touch driving signal to the touch sensors TE through the touch lines T1 to Tk and a sensing circuit that senses a change in capacitance of the touch sensors TE through the touch lines T1 to Tk to generate touch sensing data.

Alternatively, when the touch display panel 100 is implemented in the self-capacitance type, the read-out integrated circuit ROIC may supply the touch driving signal to the touch sensors TE using one circuit and obtain the touch sensing data from the touch sensors TE.

Referring again to FIG. 1, the touch sensing device 220 includes the touch driving apparatus 221 and the touch controller 222.

The touch driving apparatus 221 receives the touch sensing data from the touch sensors TE by driving the touch sensors TE during the touch sensing period TP.

The touch driving apparatus 221 may include a plurality of readout integrated circuits ROIC.

The read-out integrated circuit ROIC supplies the common voltage Vcom to the touch sensors TE through the touch lines T1 to Tk during the display period DP. Accordingly, the touch sensors TE perform a function as the common electrode during the display period DP.

Also, in the above-described embodiment, although a source drive integrated circuit SDIC and the read-out integrated circuit ROIC are illustrated as being implemented in separate configurations, the source drive integrated circuit SDIC and the read-out integrated circuit ROIC may be implemented in an integrated form in one chip.

Hereinafter, the driving apparatus for the touch display device and the driving method for the touch display device according to one embodiment of the present disclosure will be described in detail with reference to FIG. 4.

Figure 4:
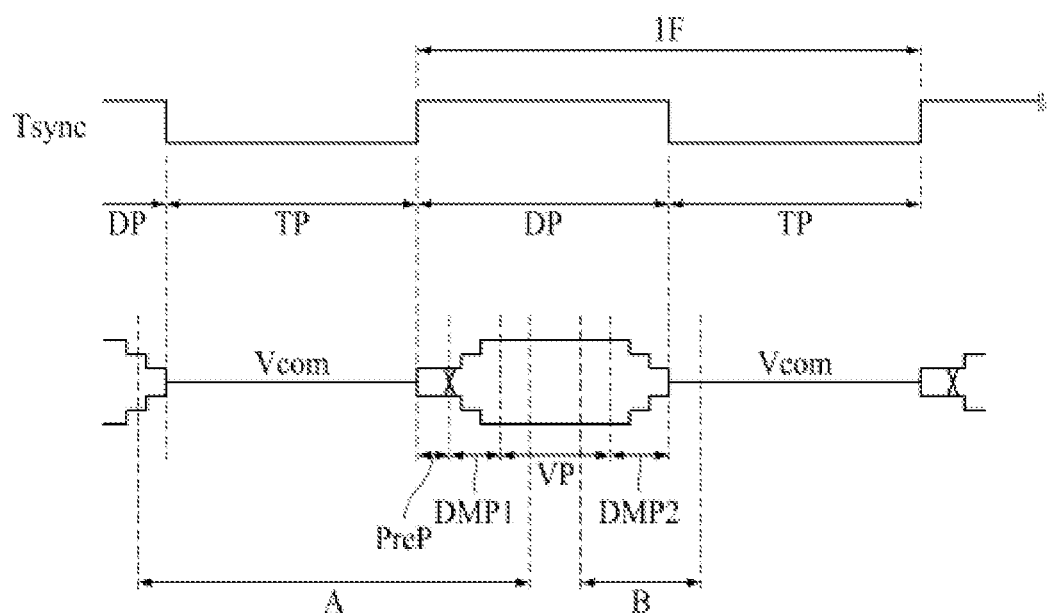
FIG. 4 is a timing diagram of a signal output by the timing controller according to one embodiment of the present disclosure.

FIG. 4 is a timing diagram of a signal output by the timing controller according to one embodiment of the present disclosure.

As described above, the timing controller 211 may generate the touch synchronization signal Tsync that time-divides into the display period DP and the touch sensing period TP to transmit the generated touch synchronization signal Tsync to the gate driving apparatus 212, the data driving apparatus 213, the touch driving apparatus 221, and the touch controller 222. Also, the timing controller 211 receives a first image signal RGB from the external system to convert the first image signal RGB into a second image signal RGB' in a form that may be processed in the data driving apparatus 213 and outputs the converted second image signal RGB'.

According to one embodiment of the present disclosure, as shown in FIG. 4, the timing controller 211 may divide the divided display period DP according to the touch synchronization signal Tsync into a preliminary period PreP a first dummy period DMP1, a valid period VP, and a second dummy period DMP2 and output different signals to the data driving apparatus 213 according to each period. In detail, the timing controller 211 may output the second image signal RGB' for the pixels P positioned on one horizontal line during the valid period VP, output the first dummy signals during the first dummy period DMP1 that is a period immediately before the valid period VP, and output the second dummy signals during the second dummy period DMP2 that is a period immediately after the valid period VP.

Hereinafter, a signal in period A output by the timing controller according to one embodiment of the present disclosure will be described in detail with reference to FIGS. 5 and 6.

Figure 5:
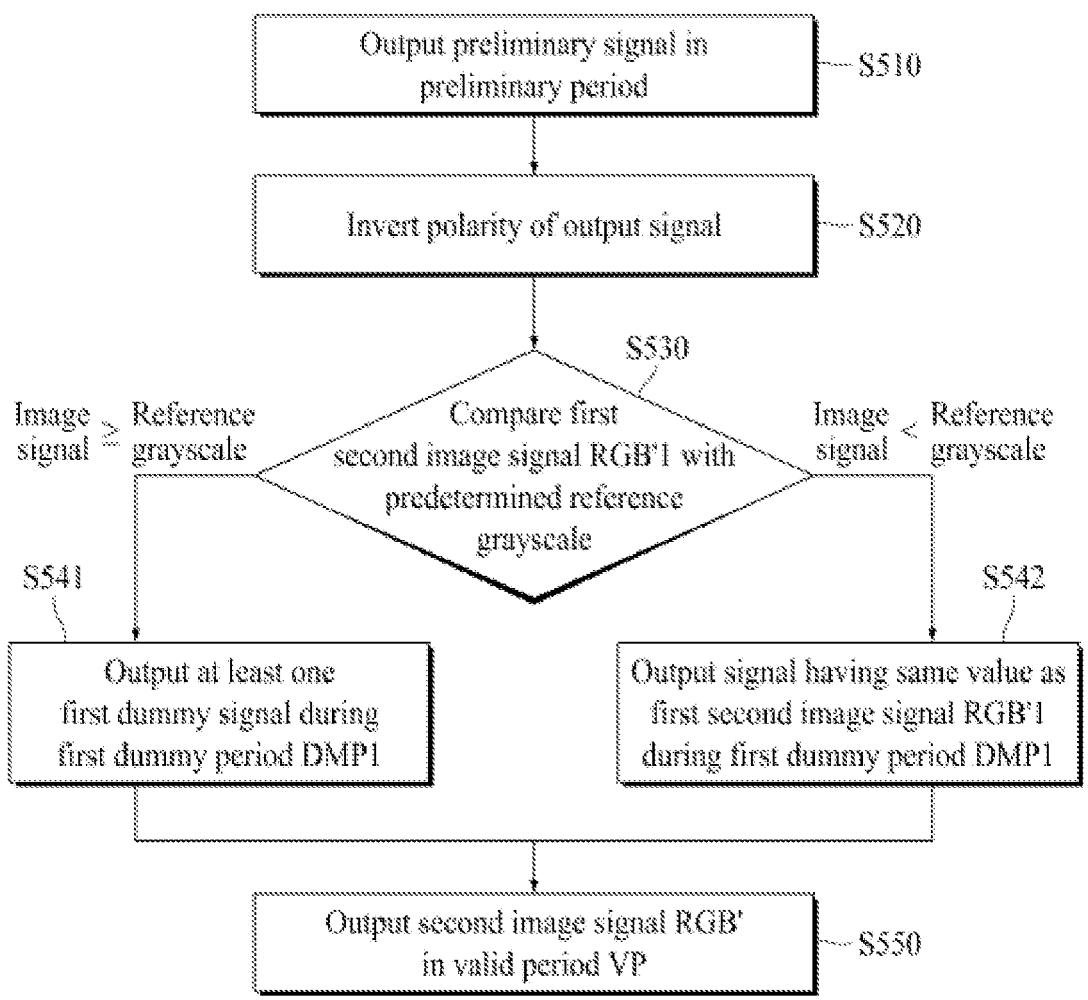
FIG. 5 is a flowchart of a driving method for the touch display device according to one embodiment of the present disclosure in period A of FIG. 4.

FIG. 5 is a flowchart of a driving method for the touch display device according to one embodiment of the present disclosure in period A of FIG. 4. FIG. 6 is a timing diagram of a signal output in period A from the timing controller according to one embodiment of the present disclosure.

Figure 6:
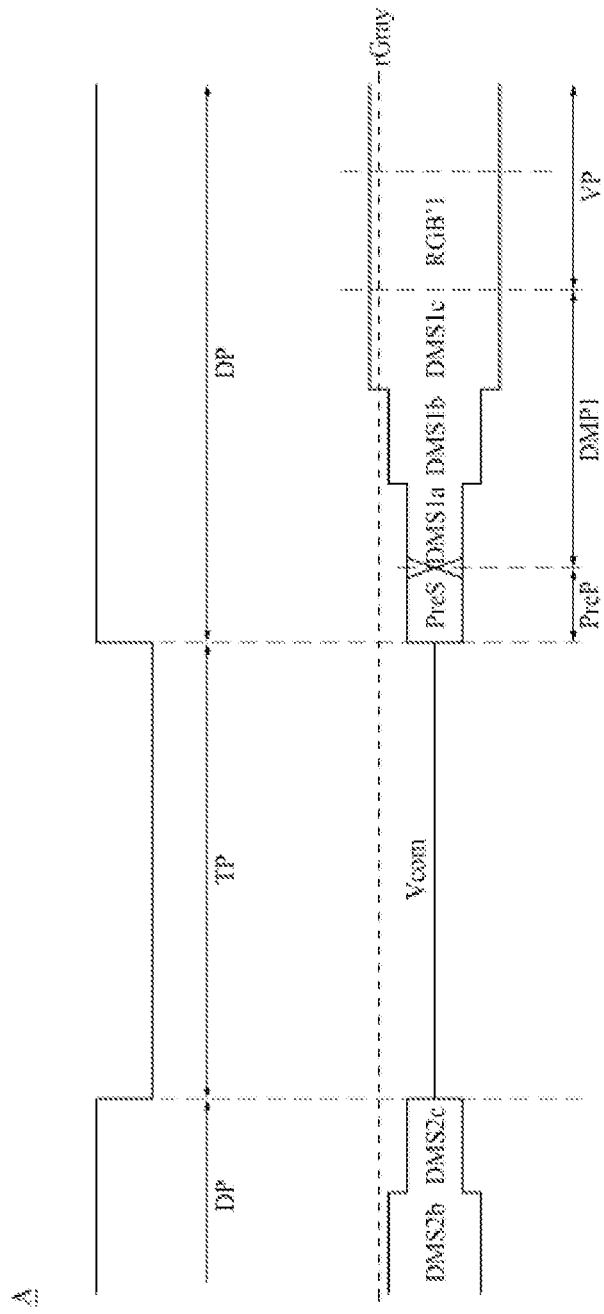
FIG. 6 is a detailed timing diagram of a signal output in period A from the timing controller according to one embodiment of the present disclosure.

Referring to FIGS. 5 and 6, the signal generation circuit 211a outputs a preliminary signal having the same value as a signal that is output lastly in the last display period DP in the preliminary period PreP (S510). In detail, as shown in FIG. 6, the signal generation circuit 211a outputs a preliminary signal PreS having the same value as the last second dummy signal DMS2c that is output lastly in the last display period DP in the preliminary period PreP that is a period immediately after the touch sensing period TP.

Thereafter, the signal generation circuit 211a inverts the polarity of the output signal (S520). In detail, as shown in FIG. 6, the signal generation circuit 211a inverts the polarity of the preliminary signal PreS output during the preliminary period PreP.

Thereafter, the dummy signal output determination circuit 211c compares a first second image signal RGB'1 of the valid period VP with a predetermined reference grayscale rGray (S530). For example, the dummy signal output determination circuit 211c may compare the first second image signal RGB'1 with the 127 grayscale that is the predetermined reference grayscale rGray.

When the dummy signal output determination circuit 211c determines that the first second image signal RGB'1 is greater than or equal to the reference grayscale rGray, the signal generation circuit 211a outputs at least one first dummy signal during the first dummy period DMP1 (S541). The signal generation circuit 211a outputs at least one first dummy signal having a value between the first second image signal RGB'1 and the common voltage signal Vcom. In detail, as shown in FIG. 6, the signal generation circuit 211a outputs at least one first dummy signal having a value close to the first second image signal RGB'1 in a stepwise manner from the common voltage signal Vcom. For example, the signal generation circuit 211a may sequentially output a first first dummy signal DMS1a having a value between the common voltage signal Vcom and the first second image signal RGB'1, a second first dummy signal DMS1b having a value between the first first dummy signal DMS1a and the first second image signal RGB'1, and a third first dummy signal DMS1c having a value between the second first dummy signal DMS1b and the first second image signal RGB'1. That is, the first, second, and third first dummy signals DMS1a, DMS1b, and DMS1c have a stepwise greater deviation from the common voltage signal Vcom and have a stepwise smaller deviation from the first second image signal RGB'1. In this case, the number of first dummy signals is not limited thereto, and the signal generation circuit 211a may output one first dummy signal during the first dummy period DMP1. As described above, the one first dummy signal may have a value between the first second image signal RGB'1 and the common voltage signal Vcom. Accordingly, the signal generation circuit 211a may sequentially output the common voltage signal Vcom, the first dummy signal, and the first second image signal RGB'1 and may output a signal that is stepwise changed from the common voltage signal Vcom to the first second image signal RGB'1.

The timing controller 211 according to one embodiment of the present disclosure outputs a first dummy signal having a value that is stepwise changed between the common voltage signal Vcom and the first second image signal RGB'1 in the first dummy period DMP1 between the touch sensing period TP in which the common voltage signal Vcom is output and a period of the valid period VP in which the first second image signal RGB'1 is output. Accordingly, a current peak caused by a signal output from the timing controller 211 is prevented, so that a display error caused by the current peak may be improved.

When the dummy signal output determination circuit 211c determines that the first second image signal RGB'1 is smaller than the reference grayscale rGray, the signal generation circuit 211a outputs a signal having the same value as the first second image signal RGB'1 during the first dummy period DMP1 (S542). In this case, since a deviation between the first second image signal RGB'1 and the common voltage signal Vcom is not large, the current peak does not occur.

Thereafter, the signal generation circuit 211a outputs the second image signal RGB' in the valid period VP (S550).

Hereinafter, a signal in period B output by the timing controller according to one embodiment of the present disclosure will be described in detail with reference to FIGS. 7 and 8.

Figure 7:
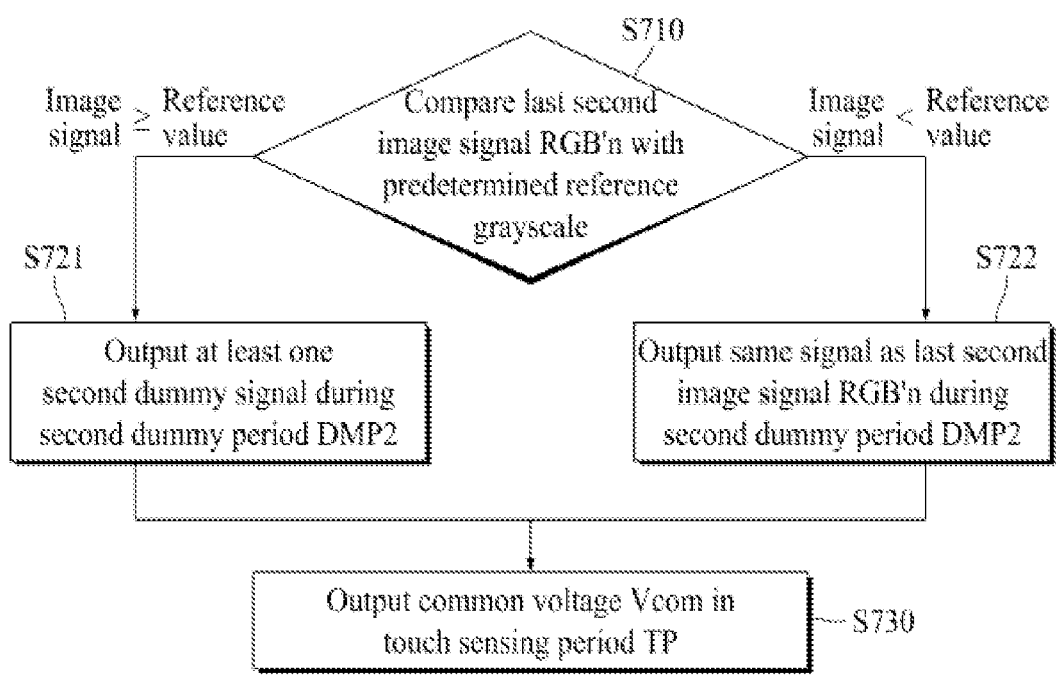
FIG. 7 is a flowchart of the driving method for the touch display device according to one embodiment of the present disclosure in period B of FIG. 4.

FIG. 7 is a flowchart of the driving method for the touch display device according to one embodiment of the present disclosure in period B of FIG. 4. FIG. 8 is a detailed timing diagram of a signal output in period B from the timing controller according to one embodiment of the present disclosure.

Figure 8:
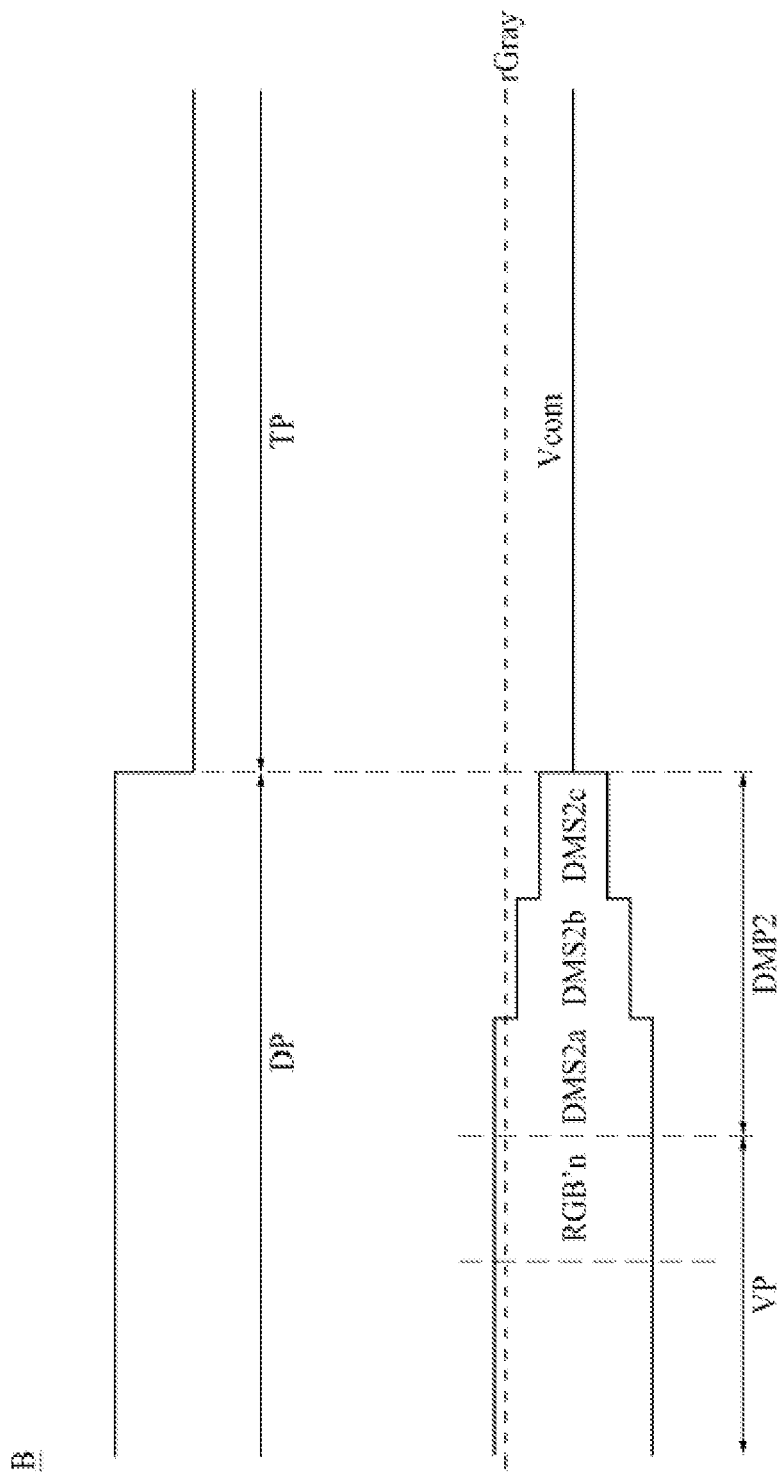
FIG. 8 is a detailed timing diagram of a signal output in period B from the timing controller according to one embodiment of the present disclosure.

Referring to FIGS. 7 and 8, the dummy signal output determination circuit 211c compares the last second image signal RGB'n with the predetermined reference grayscale rGray (S710).

When the dummy signal output determination circuit 211c determines that the last second image signal RGB'n is greater than or equal to the reference grayscale rGray, the signal generation circuit 211a outputs at least one second dummy signal during the second dummy period DMP2 (S721). The signal generation circuit 211a outputs at least one second dummy signal having a value between the last second image signal RGB'n and the common voltage signal Vcom. In detail, the signal generation circuit 211a outputs at least one second dummy signal having a value close to the common voltage signal Vcom in a stepwise manner from the last second image signal RGB'n. For example, as shown in FIG. 8, the signal generation circuit 211a may sequentially output a first second dummy signal DMS2a having a value between the last second image signal RGB'n and the common voltage signal Vcom, a second second dummy signal DMS2b having a value between the first second dummy signal DMS2a and the common voltage signal Vcom, and a third second dummy signal DMS2c having a value between the second second dummy signal DMS2a and the common voltage signal Vcom during the second dummy period DMP2. That is, the first, second, and third second dummy signals DMS2a, DMS2b, and DMS2c have a stepwise greater deviation from the last second image signal RGB'n and have a stepwise smaller deviation from the common voltage signal Vcom. In this case, the number of second dummy signals is not limited thereto, and the signal generation circuit 211a may output one second dummy signal during the second dummy period DMP2. As described above, the one second dummy signal has a value between the common voltage signal Vcom and the last second image signal RGB'n. Accordingly, the signal generation circuit 211a may sequentially output the last second image signal RGB'n, the second dummy signal, and the common voltage signal Vcom and may output a signal that is stepwise changed from the last second image signal RGB'n to the common voltage signal.

The timing controller 211 according to one embodiment of the present disclosure outputs a second dummy signal having a value that is stepwise changed between the last second image signal RGB'n and the common voltage signal Vcom in the second dummy period DMP2 between a period of the valid period VP in which the last second image signal RGB'n is output and the touch sensing period TP in which the common voltage signal Vcom is output. Accordingly, a current peak caused by a signal output from the timing controller 211 is prevented, so that a display error caused by the current peak may be improved.

When the dummy signal output determination circuit 211c determines that the last second image signal RGB'n is smaller than the reference grayscale rGray, the signal generation circuit 211a outputs the same signal as the last second image signal RGB'n during the second dummy period DMP2 (S722). In this case, since a deviation between the second image signal RGB' and the common voltage signal Vcom is not large, the current peak does not occur.

Thereafter, the signal generation circuit 211a outputs the common voltage signal Vcom in the touch sensing period TP (S730).

Hereinafter, a signal output by a timing controller according to another embodiment of the present disclosure will be described in detail with reference to FIGS. 9 to 12.

Figure 9:
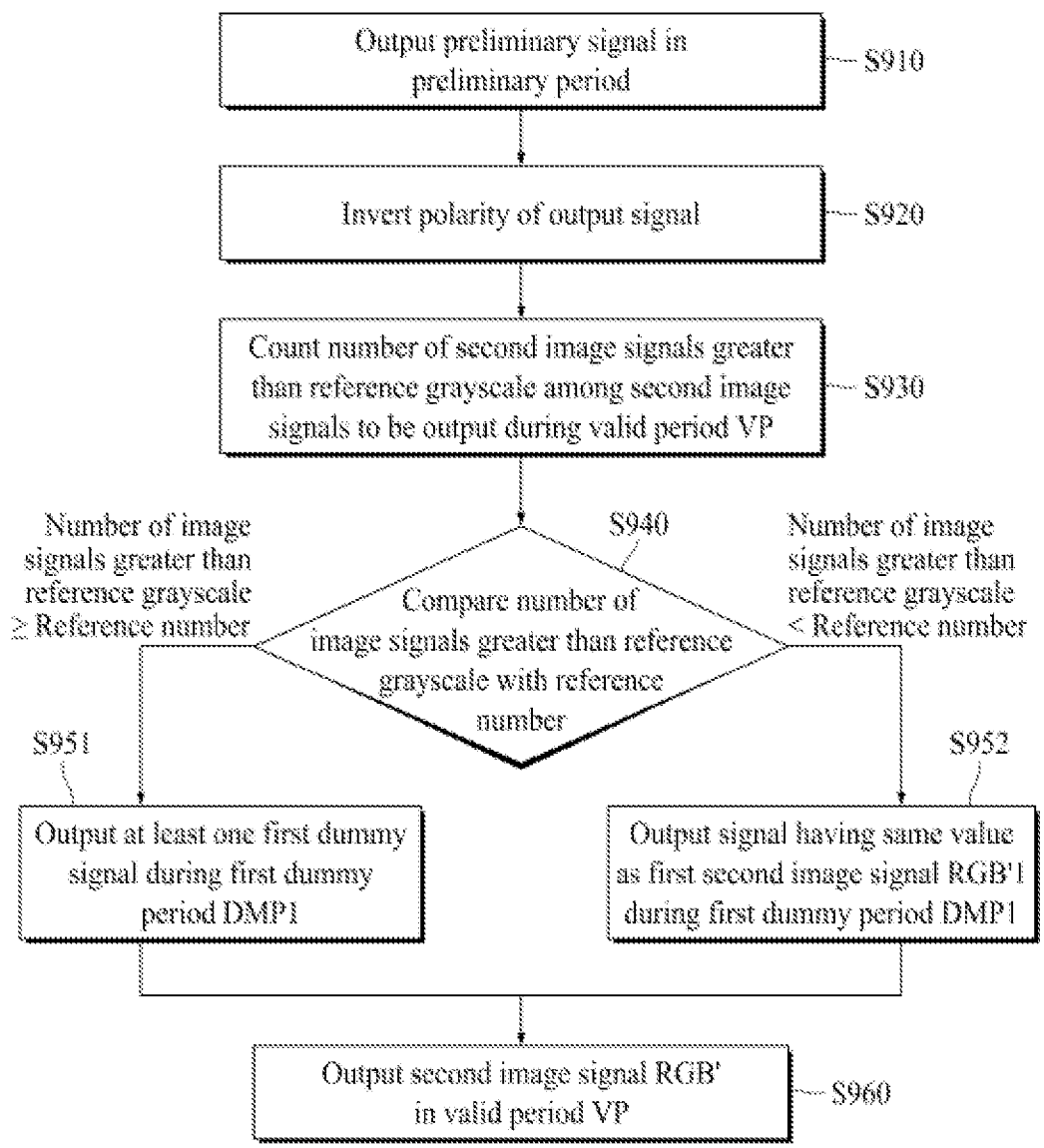
FIG. 9 is a flowchart of a driving method for the touch display device according to another embodiment of the present disclosure in period A of FIG. 4.
Figure 10:
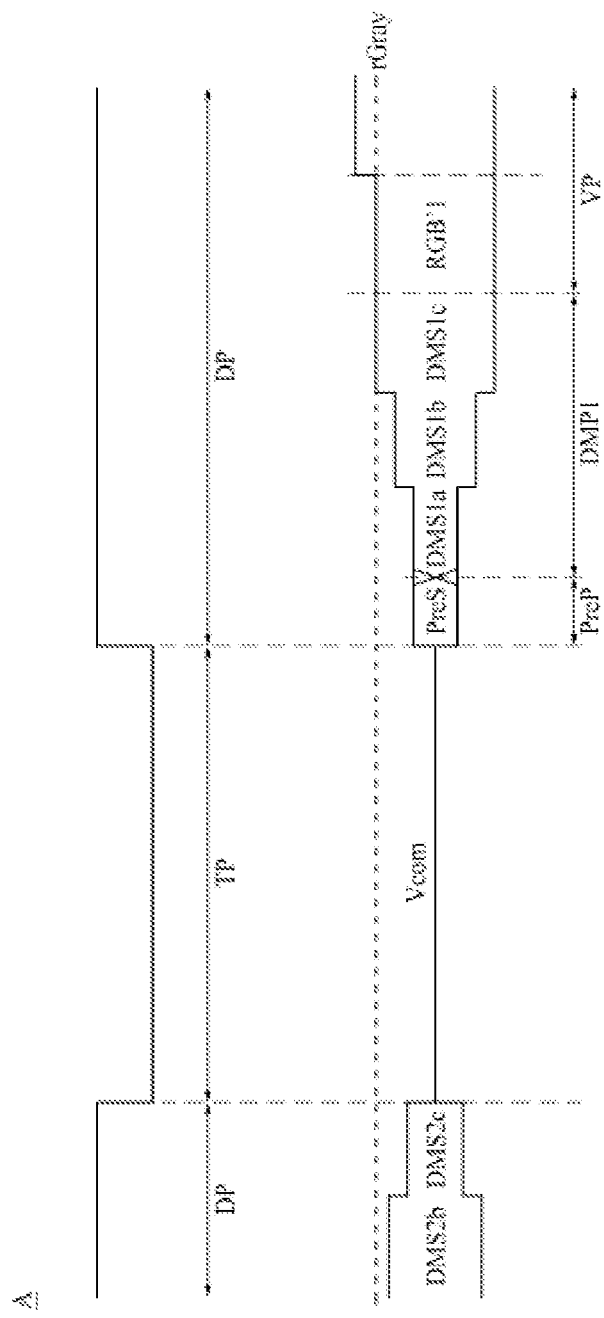
FIG. 10 is a detailed timing diagram of a signal output in period A from a timing controller according to another embodiment of the present disclosure.
Figure 11:
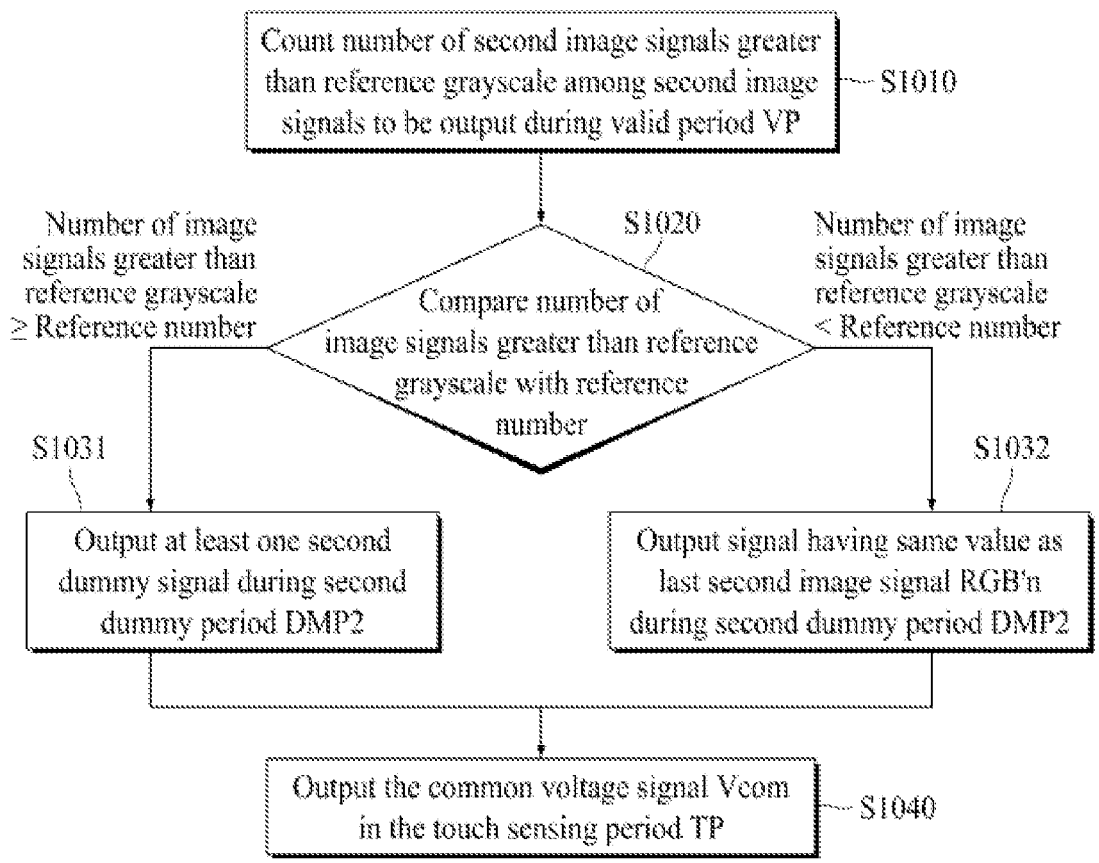
FIG. 11 is a flowchart of the driving method for the touch display device according to another embodiment of the present disclosure in period B of FIG. 4.

FIG. 9 is a flowchart of a driving method for the touch display device according to another embodiment of the present disclosure in period A of FIG. 4, FIG. 10 is a detailed timing diagram of a signal output in period A from a timing controller according to another embodiment of the present disclosure, FIG. 11 is a flowchart of the driving method for the touch display device according to another embodiment of the present disclosure in period B of FIG. 4, and FIG. 12 is a detailed timing diagram of a signal output in period B from the timing controller according to another embodiment of the present disclosure.

Referring to FIG. 9, the signal generation circuit 211a outputs the last signal output in the last display period DP in the preliminary period PreP (S910). In detail, as shown in FIG. 10, the signal generation circuit 211a outputs a preliminary signal having the same value as the third second dummy signal DMS2c that is the last signal of the second dummy period DMP2 of the last display period DP in the preliminary period PreP that is a period immediately after the touch sensing period TP.

Thereafter, the signal generation circuit 211a inverts the polarity of the output signal (S920).

Thereafter, the dummy signal output determination circuit 211c counts the number of second image signals RGB' having a value greater than the predetermined reference grayscale rGray among the second image signals RGB' to be output during the valid period VP (S930).

Thereafter, the dummy signal output determination circuit 211c compares the number of second image signals RGB' having a value greater than the reference grayscale rGray with a predetermined reference number (S940).

When the dummy signal output determination circuit 211c determines that the number of second image signals RGB' having a value greater than the reference grayscale rGray is greater than or equal to the reference number, the signal generation circuit 211a outputs at least one first dummy signal during the first dummy period DMP1 (S951). The signal generation circuit 211a outputs at least one first dummy signal having a value between the common voltage signal Vcom and the first second image signal RGB' of the valid period VP. In detail, the signal generation circuit 211a outputs at least one first dummy signal having a value close to the first second image signal RGB' of the valid period VP in a stepwise manner from the common voltage signal Vcom. For example, the signal generation circuit 211a may sequentially output a first first dummy signal DMS1a having a value between the common voltage signal Vcom and the first second image signal RGB'1, a second first dummy signal DMS1b having a value between the first first dummy signal DMS1a and the first second image signal RGB'1, and a third first dummy signal DMS1c having a value between the second first dummy signal DMS1b and the first second image signal RGB'1 during the first dummy period DMP1. That is, the first, second, and third first dummy signals DMS1a, DMS1b, and DMS1c have a stepwise greater deviation from the common voltage signal Vcom and have a stepwise smaller deviation from the first second image signal RGB'1. In this case, the number of first dummy signals is not limited thereto, and the signal generation circuit 211a may output at least one first dummy signal during the first dummy period DMP1.

The timing controller 211 according to one embodiment of the present disclosure outputs a first dummy signal having a value that is stepwise changed between the common voltage signal Vcom and the first second image signal RGB'1 in the first dummy period DMP1 between the touch sensing period TP in which the common voltage signal Vcom is output and a period of the valid period VP in which the first second image signal RGB'1 is output. Accordingly, a current peak caused by a signal output from the timing controller 211 is prevented, so that a display error caused by the current peak may be improved.

When the dummy signal output determination circuit 211c determines that the number of second image signals RGB' having a greater value than the reference grayscale rGray is smaller than the reference number, the signal generation circuit 211a outputs a signal having the same value as the first second image signal RGB'1 during the first dummy period DMP1 (S952). In this case, since the deviation between the first second image signal RGB'1 and the common voltage signal Vcom is not large, even when the first dummy signal having a value between the first second image signal RGB'1 and the common voltage signal Vcom is not output, the current peak may not occur.

Thereafter, the signal generation circuit 211a outputs the second image signal RGB' in the valid period VP (S960).

Referring to FIG. 11, the dummy signal output determination circuit 211c counts the number of second image signals RGB' having a value greater than the predetermined reference grayscale rGray among the second image signals RGB' output during the valid period VP (S1010).

Thereafter, the dummy signal output determination circuit 211c compares the number of second image signals RGB' having a value greater than the reference grayscale rGray with a predetermined reference number (S1020).

When the dummy signal output determination circuit 211c determines that the number of second image signals RGB' having a value greater than the reference grayscale rGray is greater than or equal to the reference number, the signal generation circuit 211a outputs at least one second dummy signal during the second dummy period DMP2 (S1031). The signal generation circuit 211a outputs at least one second dummy signal having a value between the last second image signal RGB'n of the valid period VP and the common voltage signal Vcom. In detail, as shown in FIG. 12, the signal generation circuit 211a outputs at least one second dummy signal having a value close to the common voltage signal Vcom in a stepwise manner from the last second image signal RGB'n. For example, the signal generation circuit 211a may sequentially output a first second dummy signal DMS2a having a value between the last second image signal RGB'n and the common voltage signal Vcom, a second second dummy signal DMS2b having a value between the first second dummy signal DMS2a and the common voltage signal Vcom, and a third second dummy signal DMS2c having a value between the second second dummy signal DMS2b and the common voltage signal Vcom during the second dummy period DMP2. That is, the first, second, and third second dummy signals DMS2a, DMS2b, and DMS2c have a stepwise greater deviation from the last second image signal RGB'n and have a stepwise smaller deviation from the common voltage signal Vcom. In this case, the number of second dummy signals is not limited thereto, and the signal generation circuit 211a may output at least one second dummy signal during the second dummy period DMP2.

The timing controller 211 according to one embodiment of the present disclosure outputs a second dummy signal having a value that is stepwise changed between the last second image signal RGB'n and the common voltage signal Vcom in the second dummy period DMP2 between a period of the valid period VP in which the last second image signal RGB'n is output and the touch sensing period TP in which the common voltage signal Vcom is output. Accordingly, a current peak caused by a signal output from the timing controller 211 is prevented, so that a display error caused by the current peak may be improved.

When the dummy signal output determination circuit 211c determines that the number of second image signals RGB' having a greater value than the reference grayscale rGray is smaller than the reference number, the signal generation circuit 211a outputs the same signal as the last second image signal RGB'n during the second dummy period DMP (S1032). In this case, since the deviation between the second image signal RGB' and the common voltage signal Vcom is not large, even when the second dummy signal having a value between the second image signal RGB' and the common voltage signal Vcom is not output, the current peak does not occur.

Thereafter, the signal generation circuit 211a outputs the common voltage signal Vcom in the touch sensing period TP (S1040).

In a driving apparatus for the touch display device and a driving method for the touch display device according to the present disclosure, a voltage difference between signals input to a touch display panel from a timing controller is reduced to prevent a current peak, and accordingly, a display error caused by the current peak can be improved.

It will be apparent to those skilled in the art that various changes and modifications may be made without departing from the spirit and scope of the disclosure.

In addition, at least a part of the methods described herein may be implemented using one or more computer programs or components. These components may be provided as a series of computer instructions through a computer-readable medium or a machine-readable medium, which includes volatile and non-volatile memories. The instructions may be provided as software or firmware and may be entirely or partially implemented in a hardware configuration such as application specific integrated circuits (ASICs), field programmable gate arrays (FPGAs), digital signal processors (DSPs), or other similar devices. The instructions may be configured to be executed by one or more processors or other hardware components, and when one or more processors or other hardware components execute the series of computer instructions, one or more processors or other hardware components may entirely or partially perform the methods and procedures disclosed herein.

Therefore, it should be understood that the above-described embodiments are not restrictive but illustrative in all aspects. The scope of the present disclosure is defined by the appended claims rather than the detailed description, and it should be construed that all alternations or modifications derived from the meaning and scope of the appended claims and the equivalents thereof fall within the scope of the present disclosure.

What is claimed is:

1. A driving apparatus for a touch display device, the driving apparatus comprising:
   a signal generation circuit configured to generate a second image signal using a first image signal, output the second image signal in a display period, generate a common voltage signal, and output the common voltage signal in a touch sensing period; and a dummy signal output determination circuit configured to determine whether to output at least one dummy signal based on the second image signal and a predetermined reference grayscale, wherein, based on (i) the common voltage signal and (ii) a determination that a grayscale related to the second image signal is equal to or greater than the predetermined reference grayscale, the signal generation circuit is configured to output the at least one dummy signal in the display period.

2. The driving apparatus for the touch display device of claim 1, wherein the display period includes a valid period for outputting the second image signal and a dummy period for outputting the at least one dummy signal between the touch sensing period and the valid period, and the at least one dummy signal has a value between a third image signal that is the second image signal output firstly in the display period or a fourth image signal that is the second image signal output lastly in the display period and the common voltage signal.

3. The driving apparatus for the touch display device of claim 2, wherein the dummy period includes a first dummy period between the valid period and the touch sensing period before the valid period, wherein the at least one dummy signal includes a first dummy signal output in the first dummy period and having a value between the common voltage signal and the third image signal, and wherein the signal generation circuit sequentially outputs the common voltage signal, the first dummy signal, and the third image signal to output a signal that is stepwise changed from the common voltage signal to the third image signal.

4. The driving apparatus for the touch display device of claim 3, wherein the first dummy signal includes a third dummy signal and a fourth dummy signal that are sequentially output, wherein a deviation between the third dummy signal and the common voltage signal is smaller than a deviation between the fourth dummy signal and the common voltage signal, and wherein a deviation between the third dummy signal and the third image signal is greater than a deviation between the fourth dummy signal and the third image signal.

5. The driving apparatus for the touch display device of claim 2, wherein the dummy period includes a second dummy period between the valid period and the touch sensing period after the valid period, wherein the dummy signal includes a second dummy signal output in the second dummy period and having a value between the fourth image signal and the common voltage signal, and wherein the signal generation circuit sequentially outputs the fourth image signal, the second dummy signal, and the common voltage signal to output a signal that is stepwise changed from the fourth image signal to the common voltage signal.

6. The driving apparatus for the touch display device of claim 5, wherein the second dummy signal includes a fifth dummy signal and a sixth dummy signal that are sequentially output, wherein a deviation between the fifth dummy signal and the fourth image signal is smaller than a deviation between the sixth dummy signal and the fourth image signal, and wherein a deviation between the fifth dummy signal and the common voltage signal is greater than a deviation between the sixth dummy signal and the common voltage signal.

7. The driving apparatus for the touch display device of claim 2, wherein the display period further includes a preliminary period for outputting a signal that was outputted last among signals outputted during the previous display period, and the preliminary period is between the touch sensing period and the dummy period.

8. The driving apparatus for the touch display device of claim 1, wherein the grayscale related to the second image signal is a grayscale related to a third image signal output first or a fourth image signal output last among second image signals output during the display period.

9. The driving apparatus for the touch display device of claim 1, wherein, when a number of second image signals having the grayscale equal to or greater than the predetermined reference grayscale among the second image signals that are output in the display period is greater than or equal to a predetermined reference number, the dummy signal output determination circuit outputs the at least one dummy signal during the display period.

10. A driving method for a touch display device comprising:

outputting a second image signal obtained by converting a first image signal in a display period;

outputting a common voltage signal during a touch sensing period; and determining whether to output at least one dummy signal based on the second image signal and a predetermined reference grayscale, wherein, based on a determination that a grayscale related to the second image signal is equal to or greater than the predetermined reference grayscale, the at least one dummy signal is output based on the second image signal and the common voltage signal in the display period.

11. The driving method for the touch display device of claim 10, wherein the display period includes a valid period outputting the second image signal and a dummy period outputting the at least one dummy signal between the touch sensing period and the valid period, and wherein the grayscale related to the second image signal is a grayscale related to a third image signal output first or a fourth image signal output last among second image signals output during the display period.

12. The driving method for the touch display device of claim 11, wherein the dummy period includes a first dummy period between the valid period and the touch sensing period before the valid period, wherein the at least one dummy signal includes a first dummy signal output in the first dummy period.

13. The driving method for the touch display device of claim 12, wherein the first dummy signal has a value between the common voltage signal and the third image signal, and wherein the common voltage signal, the first dummy signal, and the first second image signal are sequentially output to be stepwise changed from the common voltage signal to the third image signal.

14. The driving method for the touch display device of claim 13, wherein the first dummy signal includes a third dummy signal and a fourth dummy signal that are sequentially output, a deviation between the third dummy signal and the common voltage signal is smaller than a deviation between the fourth dummy signal and the common voltage signal, and a deviation between the third dummy signal and the third image signal is greater than a deviation between the fourth dummy signal and the third image signal.

15. The driving method for the touch display device of claim 11, wherein the dummy period includes a second dummy period between the valid period and the touch sensing period after the valid, and wherein the at least one dummy signal includes a second dummy signal output in the second dummy period.

16. The driving method for the touch display device of claim 15, wherein the second dummy signal has a value between the fourth image signal and the common voltage signal, and wherein the fourth image signal, the second dummy signal, and the common voltage signal are sequentially output to be stepwise changed from the fourth image signal to the common voltage signal.

17. The driving method for the touch display device of claim 16, wherein the second dummy signal includes a fifth dummy signal and a sixth dummy signal that are sequentially output, wherein a deviation between the fifth dummy signal and the fourth image signal is smaller than a deviation between the sixth dummy signal and the fourth image signal, and wherein a deviation between the fifth dummy signal and the common voltage signal is greater than a deviation between the sixth dummy signal and the common voltage signal.

18. The driving method for the touch display device of claim 10, wherein when a number of second image signals having the grayscale equal to or greater than the predetermined reference grayscale among the second image signals that are output in the display period is greater than or equal to a predetermined reference number, the at least one dummy signal is output based on the second image signal and the common voltage signal in the display period.

* * * * *